United States Patent [19]

Bianchi

[11] Patent Number: 5,727,660
[45] Date of Patent: Mar. 17, 1998

[54] INDENTED ROTOR AND WHEEL ASSEMBLY

[75] Inventor: Michael Bianchi, Shelby Township, Mich.

[73] Assignee: Varga North America, Inc., Troy, Mich.

[21] Appl. No.: 784,082

[22] Filed: Jan. 15, 1997

[51] Int. Cl.$^6$ ................................................. F16D 65/10
[52] U.S. Cl. ............................ 188/218 XL; 188/18 A; 301/6.8
[58] Field of Search .................. 188/218 XL, 218 A, 188/218 R, 18 A; 301/6.3, 6.8; 74/574

[56] References Cited

U.S. PATENT DOCUMENTS

| | | | |
|---|---|---|---|
| 3,003,590 | 10/1961 | Ash . | |
| 3,378,114 | 4/1968 | Hollins | 188/218 XL |
| 3,476,224 | 11/1969 | Büching | 188/218 A |
| 3,963,260 | 6/1976 | Inbody | 188/18 A |
| 4,792,020 | 12/1988 | Okumura et al. | 301/6.8 X |
| 5,480,007 | 1/1996 | Hartford . | |

FOREIGN PATENT DOCUMENTS

| | | | |
|---|---|---|---|
| 1081284 | 11/1964 | United Kingdom | 188/218 XL |
| 2001716 | 2/1979 | United Kingdom . | |

Primary Examiner—Robert J. Oberleitner
Assistant Examiner—Pamela J. Lipka
Attorney, Agent, or Firm—Howard & Howard

[57] ABSTRACT

A wheel assembly (10) for a vehicle comprising a rotor (12) having a central portion (14) with a periphery, a wheel mounting surface (16), and a hub mounting surface (18) opposite the wheel mounting surface (16). A hub (26) and a wheel (24) are mounted to the rotor (12) in a sandwich arrangement. The rotor (12) has a recess (30) about the periphery of the wheel mounting surface (16) of the central portion (14). The recess (30) enables the wheel (24) to be mounted on the rotor (12) to isolate clamping forces of the wheel (24) to prevent the wheel mounting forces from creating a moment which would move the disc portion (20) of the rotor (12) out of radial alignment with the wheel (24), i.e., to prevent runout of the rotor (12).

3 Claims, 1 Drawing Sheet

INDENTED ROTOR AND WHEEL ASSEMBLY

TECHNICAL FIELD

The subject invention relates to a wheel assembly for a vehicle having a brake rotor.

BACKGROUND OF THE INVENTION

A conventional wheel assembly includes a rotor, a hub and a wheel. The rotor is fixedly mounted between the hub and the wheel. The rotor has a disc portion that engages with friction pads to brake the vehicle. The wheel is in alignment with the rotor when the wheel is mounted such that the wheel is parallel to the rotor. However, during the process of mounting the wheel to the rotor, a moment is caused by forces applied by the wheel to the rotor. The moment applied by the wheel to the rotor causes the braking disc to be misaligned, which causes premature wear of the friction pads by engaging the braking disc, i.e., runout.

SUMMARY OF THE INVENTION AND ADVANTAGES

A rotor including a central portion having a periphery, a wheel mounting surface, and a hub mounting surface. The hub mounting surface is located opposite the wheel mounting surface. The hub mounting surface and the wheel mounting surface are axially spaced and parallel to each other. The rotor also includes a disc portion and an axial flange portion. The disc portion is axially offset from the central portion. The axial flange portion is disposed about the periphery of the central portion and extends axially to the disc portion. The assembly is characterized by the central portion of the rotor having a recess about the periphery of the mounting surface of the central portion for isolating clamping forces of the wheel mounted on the wheel mounting surface of the central portion to an area radially inward of the recess to prevent clamping forces from applying a moment to the axial flange portion of the rotor.

This assembly is arranged for ease of implementation and for extending the life of the friction pads of a brake assembly by reducing the amount of wear on the friction pads due to the disc portion of the rotor being misaligned, i.e., runout.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
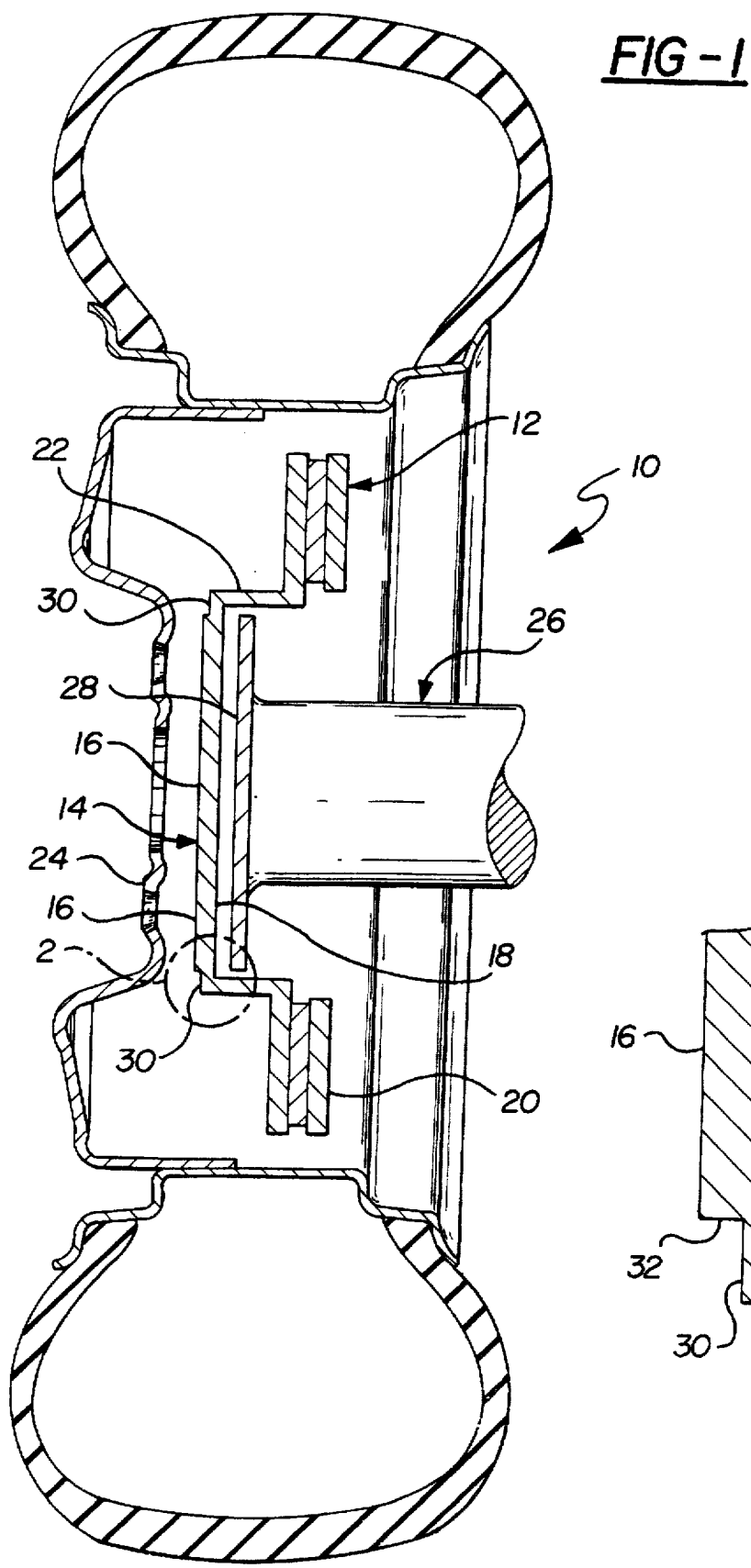
FIG. 1 is a cross sectional view of a wheel assembly including a rotor, a hub and a wheel.
Figure 2:
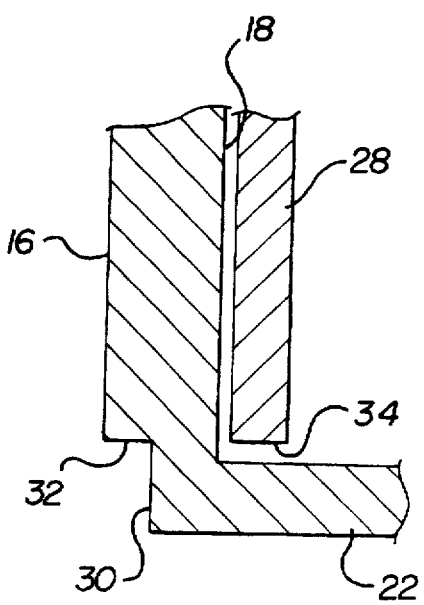
FIG. 2 is an enlarged fragmentary view taken within the circle of FIG. 1.

Referring to the Figures, wherein like numerals indicate like or corresponding parts throughout the several views, a wheel assembly is generally shown at 10. The wheel assembly 10 comprises a rotor, generally indicated at 12, including a central portion, generally indicated at 14, having a periphery and a wheel mounting surface 16, and a hub mounting surface 18. The rotor 12 further comprises an axial flange portion 22 that is disposed about the periphery of the central portion 14 of the rotor 12. The hub mounting surface 18 and the wheel mounting surface 16 are opposite each other. Further, they are axially spaced and parallel to each other. The rotor 12 includes a disc portion 20 that is axially offset from the central portion 14 of the rotor 12. The axial flange portion 22 extends axially from the central portion 14 to the disc portion 20. In other words, the axial flange portion 22 is between the central portion 14 and the disc portion 20 and connects the central portion 14 with the disc portion 20. A friction pad, i.e., brake caliper, of a brake assembly engages the disc portion 20 of the rotor 12 to brake the vehicle. A conventional wheel 24 is fixedly mounted to the wheel mounting surface 16 of the rotor 12. A hub, generally indicated at 26, is provided with a radial mounting plate 28 for connecting the hub 26 to the hub mounting surface 18 of the rotor 12. As is well known in the art, studs (not shown) extend from the mounting plate 28, through the central portion 16 of the rotor 12 for mounting the wheel with lug nuts.

The wheel assembly 10 is characterized by the central portion 14 of the rotor 12 having a recess 30 about the periphery of the wheel mounting surface 16 of the central portion 14 for isolating clamping forces of the wheel 24 mounted on the wheel mounting surface 16 of the central portion 14 to an area radially inward of the recess 30 to prevent clamping forces from applying a moment to the axial flange portion 22 of the rotor 12. Clamping forces are created as the wheel 24 is being mounted to the rotor 12. The recess 30 on the rotor 12 provides a means for isolating the clamping forces whereby the wheel 24 can be mounted without causing a moment and without causing misalignment between the rotor 12 and the wheel 24. As a result of the recess 30 on the rotor 12, the wheel 24 is mounted to the rotor 12 in parallel alignment and the disc portion 20 remains radially aligned.

The recess 30 presents an annular shoulder 32. The shoulder 32 is spaced radially inward from the periphery of the central portion 14 of the rotor 12. Further, the shoulder 32 is disposed radially inward of the axial flange portion 22 of the rotor 12 such that the recess 30 overlies the axial flange portion 22. The hub 26 has a rim 34 disposed about the periphery of the mounting plate 28. With respect to the wheel assembly 10, the annular shoulder 32 is disposed radially inward of the rotor 12 whereby the shoulder 32 overlies the rim 34 of the plate 28 of the hub 26. The hub 26 and the central portion 14 of the rotor 12 are also clamped together by studs (not shown).

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A rotor assembly (12) comprising:

a central portion (14) having a periphery and a wheel mounting surface (16), a hub mounting surface (18) opposite said wheel mounting surface (16), and said surfaces being axially spaced and parallel to each other;

a disc portion (20) axially offset from said hub mounting surface (18) of said central portion (14) in the direction opposite to said wheel mounting surface (16); and an axial flange portion (22) disposed about said periphery of said central portion (14) and extending axially from said hub mounting surface (18) to said disc portion (20);

said assembly (12) characterized by said central portion (14) of said rotor (12) having a recess (30) extending into said central portion (14) from said wheel mounting surface (16) about the periphery of said wheel mounting surface (16) of said central portion (14) for isolating claimping forces of a wheel (24) mounted on said wheel mounting surface (16) of said central portion (14) to an area radially inward of said recess (30) to prevent clamping forces from applying a moment to said axial flange portion (22), said recess (30) presenting an annular shoulder (32) spaced radially inwardly from said periphery of said central portion (14) and forming a cylinder perpendicular to said wheel mounting surface (16), said shoulder (32) being disposed radially inwardly of the radially inward extremity of said axial flange portion (22) of said rotor (12) whereby said recess (30) extends radially inwardly further than the radially inward extremity of said axial flange (22) of said rotor (12).

2. A wheel assembly (10) comprising:

a rotor (12) including a central portion (14) having a periphery, a wheel mounting surface (16), and a hub mounting surface (18) opposite said wheel mounting surface (16), said surfaces being axially spaced and parallel to each other, a disc portion (20) axially offset from said hub mounting surface (18) of said central portion (14) in the direction opposite to said wheel mounting surface (16), and an axial flange portion (22) disposed about said periphery of said central portion (14) and extending axially from said hub mounting surface (18) to said disc portion (20);

a wheel (24) fixedly mounted to said wheel mounting surface (16) of said rotor (12);

a hub (26) connected to said hub mounting surface (18) of said rotor (12) and having a radially mounting plate (28) having a rim (34);

said assembly (10) characterized by said central portion (14) of said rotor (12) having a recess (30) extending into said central portion (14) from said wheel mounting surface (16) about the periphery of said wheel mounting surface (16) of said central portion (14) for isolating clamping forces of said wheel (24) mounted on said wheel mounting surface (16) of said central portion (14) to an area radially inward of said recess (30) to prevent clamping forces from applying a moment to said axial flange portion (22) of said rotor (12), said recess presenting an annular shoulder (32) spaced radially inwardly from said periphery of said central portion (14) and forming a cylinder perpendicular to said wheel mounting surface (16), said shoulder (32) being disposed radially inwardly of the radially inward extremity of said axial flange portion (22) of said rotor (12) whereby said recess (30) extends radially inwardly further than the radially inward extremity of said axial flange portion (22) of said rotor (12).

3. An assembly (10) as set forth in claim 2 including studs clamping said hub (26) and said central portion (14) of said rotor (12) and said wheel (24) together in sandwiched relationship to one another.

* * * * *